United States Patent [19]

Patrick et al.

[11] Patent Number: 5,332,616
[45] Date of Patent: Jul. 26, 1994

[54] PRODUCE PACKAGING FILM

[75] Inventors: Ray E. Patrick, Pelzer; Solomon Bekele, Taylors, both of S.C.

[73] Assignee: W. R. Grace & Co. - Conn., Duncan, S.C.

[21] Appl. No.: 967,924

[22] Filed: Oct. 28, 1992

Related U.S. Application Data

[63] Continuation of Ser. No. 699,858, May 14, 1991, abandoned.

[51] Int. Cl.$^5$ .............................................. B32B 27/08
[52] U.S. Cl. ..................................... 428/218; 428/220; 428/516; 428/520; 428/910; 428/35.7; 426/127
[58] Field of Search ............... 428/516, 520, 910, 218, 428/220

[56] References Cited

U.S. PATENT DOCUMENTS

| | | | |
|---|---|---|---|
| 4,425,268 | 1/1984 | Cooper | 524/110 |
| 5,023,143 | 6/1991 | Nelson | 428/516 |

FOREIGN PATENT DOCUMENTS 0216640  3/1985  Japan .

*Primary Examiner*—P. C. Sluby
*Attorney, Agent, or Firm*—Mark B. Quatt

[57] ABSTRACT

A multilayer film suitable for packaging produce comprises a core layer comprising a blend of ethylene butyl acrylate copolymer and very low density polyethylene; and two outer layers comprising a blend of ethylene alpha olefin copolymer having a density of at least about 0.916 grams per cubic centimeter, and ethylene vinyl acetate copolymer.

10 Claims, 1 Drawing Sheet

PRODUCE PACKAGING FILM

This application is a continuation of application Ser. No. 699,858 filed on May 14, 1991, now abandoned.

FIELD OF THE INVENTION

The present invention is directed to a film, and more particularly a packaging film useful in the packaging of food items, especially produce.

Produce is currently packaged in a variety of different materials including polyethylenes with and without ethylene vinyl acetate copolymer, polypropylene, nylon/polyethylene laminates, and polyester/polyethylene laminates. The oxygen and carbon dioxide transmission rates of such structures are of primary importance in the packaging of many food items which require a packaging material of high gas permeability, such as many fruits and vegetables, and cheese. In the case of produce packaging, regulation of the transmission of $O_2$ and $CO_2$ minimizes enzymatic browning of cut surfaces and the damaging effects of product anaerobiosis.

Gas transmission rates for vegetable packaging films have traditionally been controlled to a target by varying the overall thickness for a given formulation. Such downgauging is often done at the expense of film strength and abuse resistance. Conversely, current film structures which are abuse resistant and machinable generally lack the gas permeability and sealing properties required by such applications. The present invention provides a film which combines abuse resistance with high $O_2$ permeability.

It is thus an object of the present invention to provide a film suitable for use in the packaging of produce which combines good abuse resistance, tensile strength, and seal strength, with high $O_2$ and $CO_2$ transmission rates.

SUMMARY OF THE INVENTION

In one aspect of the present invention a multilayer film comprises a core layer comprising a blend of ethylene butyl acrylate copolymer and very low density polyethylene; and two outer layers comprising a blend of ethylene alpha olefin copolymer having a density of at least about 0.916 grams per cubic centimeter, and ethylene vinyl acetate copolymer.

Another aspect of the invention is a method for making a coextruded multilayer film comprising the steps of blending ethylene alpha olefin copolymer having a density of at least about 0.916 grams per cubic centimeter, and ethylene vinyl acetate copolymer; blending ethylene butyl acrylate copolymer and very low density polyethylene; and coextruding an inner layer of the second blend between two outer layers of the first blend.

DEFINITIONS

The term "core" or "core layer" as used herein means a layer in a multilayer film which is enclosed on both sides by additional layers.

The term "outer" or "outer layer" as used herein means an outer layer of a multilayer film, usually a surface layer.

The term "EVA" as used herein designates ethylene vinyl acetate copolymer, especially those copolymers having less than about 50 weight % vinyl acetate.

The term "ethylene alpha olefin copolymer" as used herein includes: linear low density polyethylene (LLDPE) used herein to include that group of ethylene alpha olefin copolymers having limited side chain branching and falling into a density range of about 0.916 g/cc to 0.925 g/cc; and linear medium density polyethylene (LMDPE) used herein to include that group of ethylene alpha olefin copolymers having limited side chain branching and falling into a density range of about 0.926 g/cc to 0.940 g/cc. Typical brand names for such materials include Dowlex from Dow Chemical Company, Ultzex and Neozex from Mitsui Petro Chemical Company, and Sclair from duPont. The alpha-olefin comonomers are typically butene-1, pentene-1, hexene-1, octene-1, etc.

The term "very low density polyethylene" (VLDPE) as used herein refers to ethylene alpha olefin copolymers which have a density of about 0.915 g/cc or less and, more preferably, 0.912 g/cc or less. Typical VLDPE resins are those designated DFDA by Union Carbide and are believed to principally or usually have butene or isobutene as a comonomer. The very low density polyethylenes as compared to LLDPE, usually have significantly higher comonomer content and distinctly different properties making them a distinct class of polymers. Typically, resins designated "ULDPE" resins come from Dow and are believed to have octene as the comonomer. There is a slight difference in properties which is thought to be attributable to the comonomer. "Very low density polyethylene" (VLDPE) as used herein encompasses both VLDPE and ULDPE.

The term "ethylene butyl acrylate copolymer", or "EBA", is used herein to refer to copolymers of ethylene and butyl acrylate, generally n-butyl acrylate, having preferably between about 0.8% and 30%, more preferably about 18% butyl acrylate comonomer by weight.

The term "oriented" is used herein to refer to the alignment of the molecules of a polymer predominately in a particular direction. The term is used interchangeably with "heat shrinkability" and the like and designates material which has been stretched and set at its stretched dimensions. The material will have a tendency to return to its original dimensions when heated to a specific temperature below its melting temperature range.

The term "cross-linked" as used herein means that bonds have been formed between the molecules of a particular polymer. Cross-linking of some polymers can be induced by subjecting them to ionizing radiation such as gamma or X-rays or electrons or beta particles. For cross-linkable polymers such as polyethylene or ethylene vinyl acetate copolymer, the irradiation dosage level can be related to the degree of cross-linking by considering the insoluble gel, i.e. the portion of the polymer which will not dissolve in a solvent such as boiling toluene, to be the cross-linked portion of the irradiated polymer. Usually there is no measurable gel for radiation dosages of less than 0.5 megarads.

BRIEF DESCRIPTION OF THE DRAWINGS

The invention may be further understood by reference to the sole FIGURE drawing in which:

The FIGURE is a schematic cross-section of a film of the present invention.

DESCRIPTION OF THE PREFERRED EMBODIMENTS

Figure 1:
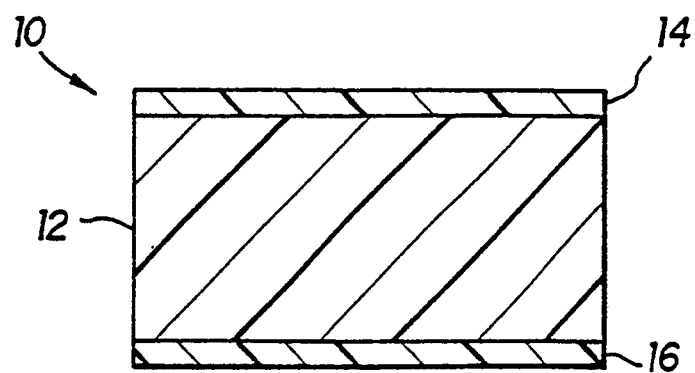

Referring to the FIGURE, which is a cross sectional view of a three layered preferred embodiment of the present invention, it is seen that this embodiment comprises core layer 12, and outer layers 14 and 16 disposed on either side of the core layer. A preferred thickness ratio of the three layers is suggested by the drawing. Preferably, the outer layers are relatively thin, and core layer 12 comprises about 40% to 95%, more preferably 60% to 90%, and even more preferably 75% to 85% of the total thickness of the multilayer film.

The core layer comprises very low density polyethylene (VLDPE), ethylene butyl acrylate copolymer (EBA), or blends thereof. The VLDPE contributes processability and toughness to the overall film. It also increases the shrink tension of the film, other factors being equal, so that it is preferred that the VLDPE be blended with EBA. VLDPE is available from Dow under the trade designation Attane 4203. Ethylene butyl acrylate copolymer (EBA), having normal butyl acrylate comonomer, is available from Quantum under the designation EA 719-009. Preferred blend ratios include 5% EBA/95% VLDPE; 30% EBA/70% VLDPE; 50% EBA/50% VLDPE; 70% EBA/30% VLDPE; and 95% EBA/5% VLDPE.

Outer layers 14 and 16 comprise a blend of ethylene alpha-olefin copolymer having a density of at least about 0.916 grams per cubic centimeter, and ethylene vinyl acetate copolymer. A suitable LLDPE resin may be of the series of LLDPE resins produced by Dow Chemical Company. Several other manufacturers offer LLDPE resins e.g. Union Carbide and Exxon.

Although it is preferred that outer layers 14 and 16 be identical, and comprise the same blend ratio of polymeric material, different blends can be used for layers 14 and 16.

Small amounts of processing aids or other additives may be added for example by a master batch process, wherein the master batch comprises between about 1% and 100% by weight of the outer layer.

In the preferred process for making the multilayer shrink film of the present invention basic steps are blending the polymers for the various layers, coextruding the layers to form a multilayer film, and then stretching the film to biaxially orient it. These steps and additional optional steps will be explained in detail in the paragraphs which follow.

The process begins by blending the raw materials (i.e. polymeric resin) in the proportions and ranges desired as discussed earlier. The resins are usually purchased from a supplier in pellet form and can be blended in any one of a number of commercially available blenders as is well known in the art. During the blending process any additives and/or agents which are desired to be utilized are also incorporated.

Blending of processing aids and other additives into a master batch is also preferably accomplished prior to coextrusion to insure uniform distribution of the additives throughout the resin.

The blend resins and applicable additives and/or agents are then fed into the hoppers of extruders which feed the coextrusion die. The materials are coextruded preferably as a tube having a diameter which depends on the stretching ratio and desired final diameter. This coextruded tube is relatively thick and is referred to as the tape. Circular coextrusion dies are well known in the art and can be purchased from a number of manufacturers. In addition to tubular coextrusion, slot dies could be used to coextrude material in planar form. Well known single or multilayer extrusion coating processes could also be employed if desired.

An optional processing step which may be utilized is the irradiation of the tape by bombarding the tape with for example high energy electrons from an accelerator to cross-link the materials of the tape. Cross-linking greatly increases the structural strength of the film or the force at which the material can be stretched before tearing apart. Thus, when using outer layers of LLDPE, cross-linking is particularly advantageous in processing the tape into a shrinkable film. The irradiation also improves the optical properties of the film and changes the properties of the film at higher temperatures. Preferred radiation dosages for the present multilayer film are in the range of about 1 megarad (MR) or less to about 3 megarads.

Following coextrusion, quenching, and optionally irradiation, the extruded tape is reheated and continuously inflated by internal air pressure into a bubble (blown bubble technique) thereby transforming the narrow tape with thick walls into a wider film with thin walls of the desired film thickness. After stretching, the bubble is then deflated and the film wound onto semifinished rolls called mill rolls. During the orienting step, film is oriented by stretching it transversely and longitudinally to rearrange the molecules and impart shrink capabilities such as shrink tension and free shrink to the film. Biaxial orientation ratios of 3.0 to 6.0 in each of the machine and transverse directions are preferred. More preferably, biaxial orientation ratios of 5.0 in each of the machine and transverse directions are preferred.

Other bonding techniques, including the use of conventional lamination adhesives, can also be used. However, bonding techniques in which a separate adhesive is utilized are less desirable than coextrusion.

In the preferred embodiment, packaging film of the present invention is especially suitable for use as rollstock in connection with vertical form fill seal machinery, or as vacuum packaged bags.

The invention may be further understood by reference to the following tables. Table 2 compares various physical properties of the films of Examples 1-6. Table 1 identifies the resins used in Table 2.

TABLE 1

| ABBREVIATION | COMMERCIAL NAME | SUPPLIER |
|---|---|---|
| $VLDPE_1$ = | ATTANE 4203 | DOW |
| $EBA_1$ = | EA 719-009 | QUANTUM |
| $LLDPE_1$ = | DOWLEX 2045 | DOW |
| $LMDPE_1$ = | DOWLEX 2037.01 | DOW |
| $EVA_1$ = | PE 204-CS 95 | EL PASO |

TABLE 2

| EXAMPLE NUMBER.: | | 1 | 2 | 3 |
|---|---|---|---|---|
| Structure | | A/B/A | A/B/A | A/B/A |
| | Where A = | 50% $LLDPE_1$ + 25% $LMDPE_1$ + | 50% $LLDPE_1$ + 25% $LMDPE_1$ + | 50% $LLDPE_1$ + 25% $LMDPE_1$ + |

TABLE 2-continued

| | | | | |
|---|---|---|---|---|
| | and B = | 25% EVA$_1$ 0% EBA$_1$ + 100% VLDPE$_1$ | 25% EVA$_1$ 100% EBA$_1$ + 0% VLDPE$_1$ | 25% EVA$_1$ 30% EBA$_1$ + 70% VLDPE |
| Layer Ratio | | 1/2/1 | 1/4.6/1 | 1/4.6/1 |
| Tensile At Break[1] [psi] | LD[2] | 14,532 | 6,230 | 9,611 |
| | TD[3] | 13,839 | 6,482 | 8,710 |
| Elongation At Break[4] [%] | LD | 143 | 83 | 107 |
| | TD | 170 | 77 | 112 |
| Oxygen Transmission[5] [CCSTP/(24 HRS, SQ.M., ATM)] | | 6303 | 8938 | 9321 |
| CO$_2$ Transmission[6] [CCSTP/(24 HRS., SQ.M., ATM)] | | 16523 | 21190 | 22048 |
| Heat Seal Strength [psi] | | 6.7 | 4.7 | 4.7 |
| EXAMPLE NUMBER.: | | 4 | 5 | 6 |
| Structure | | A/B/A | A/B/A | A/B/A |
| | Where A = | 50% LLDPE$_1$ + 25% LMDPE$_1$ + 25% EVA$_1$ | 50% LLDPE$_1$ + 25% LMDPE$_1$ + 25% EVA$_1$ | 50% LLDPE$_1$ + 25% LMDPE$_1$ + 25% EVA$_1$ |
| | and B = | 70% EBA$_1$ + 30% VLDPE | 30% EBA$_1$ + 70% VLDPE$_1$ | 70% EBA$_1$ + 30% VLDPE$_1$ |
| Layer Ratio | | 1/4.6/1 | 1/2/1 | 1/2/1 |
| Tensile At Break[1] [psi] | LD[2] | 7,530 | 11,793 | 9,934 |
| | TD[3] | 5,988 | 9,481 | 8,630 |
| Elongation At Break[4] [%] | LD | 91 | 117 | 106 |
| | TD | 100 | 130 | 106 |
| Oxygen Transmission[5] [CCSTP/(24 HRS, SQ.M., ATM)] | | 9068 | 7691 | 6271 |
| CO$_2$ Transmission[6] [CCSTP/(24 HRS., SQ.M., ATM)] | | 25413 | 18705 | 21355 |
| Heat Seal Strength [psi] | | 4.9 | 6.8 | 5.2 |

Notes:
[1] ASTM D 882
[2] LD = Longitudinal Direction
[3] TD = Transverse Direction
[4] ASTM D 882
[5] ASTM D 3985
[6] Carbon dioxide transmission rates were determined using an 'Atory (Registered Trademark) A 2 gas transmission analyzer unit. Test specimens are clamped in diffusion cells. The bottom side of the cell is purged with a carrier gas such as helium for 3 minutes, and a diffusion cell is then sealed for a preselected time period. The sample gas flows through the top portion of the cells in the standard gas sampling valve. At the end of the given time period, the sealed bottom side of the cells is opened one at a time and the difused gas is swept into a GOW-MAC (Registered Trademark) thermal conductivity cell with the carrier gas. The thermal conductivity cell sends a signal to an integrating recorder for measurement. Calibration of the gas sampling valve enables the operator to measure the thermal conductivity cell response and calculate the amount of sample gas flowing from the diffusion cell into the thermal conductivity cell.

All of the film samples had a nominal thickness of 1.25 mils. Total film thickness can range from 0.60 mils to 2 mils, more preferably 0.75 mils to 1.5 mils.

Obvious modifications to the invention as described can be made by one skilled in the art without departing from the spirit and scope of the claims as presented below.

What is claimed is:

1. An oriented multilayer film comprising:
   a) a core layer comprising a blend of ethylene butyl acrylate copolymer and very low density polyethylene; and
   b) two outer layers comprising a blend of ethylene alpha olefin copolymer having a density of at least about 0.916 grams per cubic centimeter, and ethylene vinyl acetate copolymer.

2. A multilayer film according to claim 1 wherein said film has an oxygen transmission rate of between about 6,000 cc/m$^2$ and 10,000 cc/m$^2$ per 1.25 mil at standard temperature and pressure in 24 hours (ASTM 3985).

3. A multilayer film according to claim 1 wherein said film has a carbon dioxide transmission rate of between about 16,000 cc/m$^2$ and 26,000 cc/m$^2$ per 1.25 mil at standard temperature and pressure in 24 hours.

4. A multilayer film according to claim 1 wherein the ethylene alpha olefin copolymer of the outer layers comprises linear low density polyethylene.

5. A multilayer film according to claim 1 wherein the ethylene alpha olefin copolymer of the outer layers comprises linear medium density polyethylene.

6. A multilayer film according to claim 1 wherein the ethylene alpha olefin copolymer of the outer layers comprises linear low density polyethylene and linear medium density polyethylene.

7. A multilayer film according to claim 1 wherein the two outer layers each comprise a blend of linear low density polyethylene, linear medium density polyethylene, and ethylene vinyl acetate copolymer.

8. A multilayer film according to claim 7 wherein the two outer layers each comprise a blend of between about 40% and 60% linear low density polyethylene, between about 20% and 30% linear medium density polyethylene, and between about 20% and 30% ethylene vinyl acetate copolymer.

9. The film according to claim 1 wherein the film has been oriented by racking at a racking ratio of from about 3.0 to about 6.0 in both the longitudinal and transverse directions.

10. The film according to claim 1 wherein the film has been cross-linked.

* * * * *